United States Patent [19]

Ramzan

[11] Patent Number: 5,004,502

[45] Date of Patent: Apr. 2, 1991

[54] NON-IRRITATING DETACKIFYING COMPOSITION

[76] Inventor: Chaudhary M. Ramzan, 91 Oak Bluff Rd., Milford, Conn. 06460

[21] Appl. No.: 571,207

[22] Filed: Aug. 23, 1990

[51] Int. Cl.$^5$ ............................................... C09K 3/00
[52] U.S. Cl. ........................... 106/287.13; 106/287.16; 106/901
[58] Field of Search ................ 106/287.1, 287.16, 901, 106/287.13; 524/269

[56] References Cited

U.S. PATENT DOCUMENTS

| | | | |
|---|---|---|---|
| 2,803,613 | 8/1957 | Kather et al. | 106/287.1 |
| 4,362,833 | 12/1982 | Mune et al. | 524/269 |
| 4,736,048 | 4/1988 | Brown et al. | 106/287.14 |

Primary Examiner—Theodore Morris
Assistant Examiner—Mary C. DiNunzio
Attorney, Agent, or Firm—Melvin I. Stoltz

[57] ABSTRACT

By combining a volatile, low viscosity silicone fluid composition, a paraffinic solvent, and a polybutene polymer, a unique, non-toxic, non-irritating detackifying composition is attained which is capable of substantially reducing the adhesive qualities of typical adhesive bandages, allowing such bandages to be easily removed, without pain or discomfort. In addition, the detackifying composition of this invention is constructed to allow its unrestricted use in such removal assistance, without fear of causing skin irritations or adverse skin reactions.

10 Claims, No Drawings

NON-IRRITATING DETACKIFYING COMPOSITION

FIELD OF THE INVENTION

This invention relates to detackifying compositions and more particularly to detackifying compositions for use in assisting in the removal of adhesive bandages.

BACKGROUND ART

With the ever increasing popularity of various adhesive bandage systems for both home use as well as professional use, the difficulties encountered in removing adhesive bandages from the body are well known. In particular, the pain and discomfort caused by removing an adhesive bandage from the body of an individual is well known to most people.

Typically, a bandage is securely adhered to the skin of the individual in order to achieve its desired result. However, when the bandage is to be removed, the adhesive continues to adhere strongly to both hair and skin, causing great difficulty and pain to the individual as the surface skin and hairs are separated from the adhesive material.

In an attempt to overcome the discomfort caused by removal of adhesive bandages, the adhesive level employed on some bandages has been reduced, so that removal can be accomplished with less discomfort. However, as a result of this approach, the efficacy of the adhesive has been reduced and these bandages tend to become dislodged more easily, when not desired.

An alternate approach has been to employ a detackifying solution to the bandage in order to reduce the adhesive effect prior to the removal of the bandage. However, the present state of the art compositions incorporate ingredients which are known to have toxic effects which may cause skin irritations from use. Consequently, such detackifying compositions are not generally available to the purchasing public and are distributed only to hospitals or physicians for controlled use.

Consequently, it is a principal object of the present invention to provide a detackifying composition which incorporates no harmful or toxic ingredients.

A further object of the present invention is to provide a detackifying composition having the characteristic features described above which can be quickly and easily used by the general public to assist in removing adhesive bandages.

A further object of the present invention is to provide a detackifying composition having the characteristic features described above which is easy to use and is highly effective in reducing the adhesive characteristics of conventional bandages, thereby allowing adhesive bandages to be removed quickly and easily without any discomfort.

Other and more specific objects will in part be obvious and will in part appear hereinafter.

DETAILED DESCRIPTION

In the present invention, the prior art drawbacks and difficulties are eliminated and a detackifying composition is attained which is non-toxic and possesses no skin irritating properties. In addition, the detackifying composition of the present invention is not hazardous and can be used by anyone, freely and easily without fear of unwanted side effects or adverse skin reactions.

The present invention provides a non-toxic, non-hazardous detackifying composition by combining a volatile, low viscosity silicone fluid composition with an isoparaffinic or normal paraffinic solvent and an isobutylene butene copolymer. By combining these three ingredients into a single composition, a highly effective, non-toxic detackifying composition is attained.

In the preferred embodiment, the volatile, low viscosity silicone fluid composition employed comprises a polydimethylcyclosiloxane. Preferably, the polydimethylcyclosiloxane employed in the detackifying composition of this invention comprises octamethylcyclotetrasiloxane. However, it has also been found that decamethylcyclopentasiloxane can also be employed with substantially equal efficacy.

Furthermore, it has also been found that Dow Corning 244 Fluid, manufactured by the Dow Corning Corporation of Midland, Mich., comprises the preferred formulation for the polydimethylcyclosiloxane. In addition, it has been found that the polydimethylcyclosiloxane should comprise at least 20% by weight/volume of the final composition, with the maximum amount being 90% by weight/volume of the final composition.

The second component of the detackifying composition of the present invention comprises an isoparaffinic or normal paraffinic solvent, selected for softening the adhesive bond. It has been found that the preferred composition for the paraffinic solvent comprises substantially a 100% composition of the saturated normal paraffin structure. In addition, between about 10% and 70% by weight/volume of the final detackifying composition should comprise the paraffinic solvent.

In addition, the preferred saturated paraffinic solvent comprises normally arranged carbon chains having an overall length ranging between 10 and 18 carbon atoms, with an initial boiling point during distillation ranging between 188° C. (370° F.) and 252° C. (487° F.). Furthermore, it has been found that the preferred composition for the normal paraffinic solvent employed in the present invention is known by the trade name NORPAR, which is available from the Exxon Corporation, U.S.A. of Houston, Tex. NORPAR is a brand name for three solvent grades of this very high normal paraffin, with all three grades being found to be employable in the present invention. These three grades are designated as NORPAR-12, NORPAR-13 and NORPAR-15.

Although the alternate grades of NORPAR have been found to be effective in providing an efficacious detackifying composition, NORPAR-12 has been found to be preferred over the other compositions. This preferred normal paraffinic solvent, or its equivalent, comprises normally arranged carbon chains having an overall length ranging between 10 and 13 carbon atoms, while also possessing an initial boiling point during distillation of 188° C. (370° F.), a viscosity, cSt at 25° C. of 1.68 and a specific gravity at 15.6° C. of 0.751.

It has also been found that an effective detackifying composition can also be attained by employing isoparaffinic solvents, either in combination with, or as a substitute for, the normal paraffinic solvents. Preferably, the isoparaffinic solvents comprise one or more selected from the group consisting of ISOPAR-G, ISOPAR-C, ISOPAR-E, ISOPAR-H, and ISOPAR-L, all of which are manufactured by Exxon Corporation U.S.A. of Houston, Tex.

The third component of the detackifying composition of the present invention comprises isobutylene butene copolymers for plasticizing the adhesive coating and helping the penetration of the solvent and the detackifying silicone fluid into the polymer for the reduction of adhesion. In order to attain an effective, non-irritating, detackifying composition, it has been found that the isobutylene butene copolymer should comprise at least 1% by weight/volume of the final composition with the maximum amount being 20% by weight/volume of the final composition.

In the preferred embodiment, the isobutylene butene copolymers comprise an average molecular weight ranging between about 300 and 475, with a specific gravity ranging between about 0.8 and 0.9 as measured by ASTM Standard D-1298 at 15.5° C. In addition, it has also been found that the isobutylene butene copolymer preferably comprises an average molecular weight of about 320 with a specific gravity of 0.830 to 0.845 as measured using ASTM Standard D-1298 at 15.5° C.

Although any isobutylene butene copolymer having these physical characteristics could be employed, the preferred isobutylene butene copolymer comprises POLYBUTENE L-14 as manufactured by the Amoco Chemical Company of Chicago, Ill. In addition to this particular isobutylene butene copolymer, it has also been found that Amoco's POLYBUTENE L-150 and L-100 can also be employed in the composition of the present invention, without departing from the scope of this invention.

If desired, an antiseptic solution can also be incorporated into the detackifying composition of the present invention. Although any desired antiseptic solution can be employed, it has been found that isopropyl alcohol can be effectively used with the other components of the detackifying composition of this invention. Furthermore, it has also been found that between about 0% and 0.9% by weight of the isopropyl alcohol is sufficient to provide the desired effect, with the paraffinic solvent being reduced to accommodate the amount of the antiseptic solution being added.

EXAMPLES

In order to prove the efficacy of the present invention, the compositions defined in Tables 1–5 were prepared and tested. In Table 1, the contents of the four examples are detailed using the generic constituents. However, in Tables 2–5, the trade names identified above are employed in order to define the precise preferred ingredient used in the various sample compositions disclosed. As discussed above, the Dow Corning Fluid is manufactured by Dow Corning Corporation of Midland, Mich., while the NORPAR and ISOPAR products are manufactured by Exxon Corporation U.S.A. of Houston, Tex. Finally, the POLYBUTENE ingredients detailed in these tables are manufactured by Amoco Chemical Company of Chicago, Ill.

TABLE 1

|  | A | B | C | D |
|---|---|---|---|---|
| Volatile, Low Viscosity Silicone Fluid | 59.8 | 59.8 | 79.8 | 50 |
| Paraffinic Solvent | 20.0 | 39.0 | 25.0 | 39.8 |
| Isobutylene Butene Copolymer | 20.0 | 1.0 | 5.0 | 10.0 |
| Isopropyl Alcohol | 0.2 | .2 | .2 | .2 |

TABLE 2

|  | E | F | G | H |
|---|---|---|---|---|
| Dow Corning Fluid 244 | 60 | 60 | 60 | 64.8 |
| Norpar-12 | 34.8 | x | x | 10 |
| Norpar-13 | x | 34.8 | x | 10 |
| Norpar-15 | x | x | 34.8 | 10 |
| Polybutene L-14 | 5 | 5 | 5.0 | 5 |
| Isopropyl Alcohol | .2 | .2 | .2 | .2 |

TABLE 3

|  | I | J | K | L | M |
|---|---|---|---|---|---|
| Dow Corning Fluid 244 | 59.8 | 59.8 | 59.8 | 59.8 | 59.8 |
| Norpar-12 | 30 | 30 | 30 | 30 | 30 |
| Polybutene L14 | 10 | x | x | 5 | 4 |
| Polybutene L50 | x | 10 | x | 5 | 3 |
| Polybutene L100 | x | x | 10 | x | 3 |
| Isopropyl Alcohol | .2 | .2 | .2 | .2 | .2 |

TABLE 4

|  | N | O | P | Q |
|---|---|---|---|---|
| Dow Corning Silicone Fluid 244 | 80 | 70 | 80 | 70 |
| Isopar-G | 20 | 30 | 19.9 | 29.9 |
| Isopropyl Alcohol | x | x | .1 | .1 |
| TOTAL | 100 | 100 | 100 | 100 |

TABLE 5

|  | R | S | T | U | V |
|---|---|---|---|---|---|
| Dow Corning Silicone 244 | 74.8 | 10 | 50 | 74.8 | 40 |
| Isopar C | x | 90 | x | x | x |
| Isopar E | .6 | x | 50 | x | x |
| Isopar G | 24.4 | x | x | 12.5 | x |
| Isopar H | x | x | x | 12.5 | x |
| Isopar L | x | x | x | x | 60 |
| Isopropyl Alcohol | 0.2 | x | x | .2 | x |
| TOTAL | 100 | 100 | 100 | 100 | 100 |

Each of the test samples were prepared by mixing the ingredients in the manner detailed in Tables 1 and 2 and then applying the final composition to an adhesive bandage using a liquid drop dispenser. In each case, the composition was liberally applied from the drop dispenser to the adhesive bandage and spread over the entire exposed surface of the adhesive bandage. Then, the bandage was removed from the skin surface.

In each case, the adhesive bandage pulled away from the skin surface easily, without causing any pain or discomfort to the individual on whom the adhesive bandage had been placed. All of the compositions tested worked with substantially equal efficacy.

It will thus be seen that the objects set forth above, among those made apparent from the preceding description, are efficiently attained and, since certain changes may be made in the above composition without departing from the scope of the invention, it is intended that all matter contained in the above description shall be interpreted as illustrative and not in a limiting sense.

It is also to be understood that the following claims are intended to cover all of the generic and specific features of the present invention herein described and all statements of the scope of the invention which, as a matter of language, might be said to fall therebetween.

Particularly, it is to be understood that in said claims, ingredients or compounds recited in the singular are intended to include compatible mixtures of such ingredients wherever the sense permits.

Having described my invention, what I claim as new and desire to secure by Letters Patent is:

1. A detackifying composition which is highly effective, non-toxic and provides for the painless removal of adhesive bandages from the skin, such composition comprising:
   A. between about 20% and 90% by weight/volume of a volatile, low viscosity silicone fluid,
   B. between about 10% and 70% by weight/volume of a paraffinic solvent selected from the group consisting of normal paraffinic solvents and isoparaffinic solvents; and
   C. between about 1% and 20% by weight/volume of an isobutylene butene copolymer wherein said isobutylene butene copolymer is further defined as comprising an average molecular weight ranging between about 300 and 475 and a specific gravity ranging between 0.8 and 0.9 when measured by ASTM Standard D-1298 at 15.5° C.

2. The detackifying composition defined in claim 1, wherein said silicone fluid is further defined as comprising a polydimethylcyclosiloxane.

3. The detackifying composition defined in claim 2, wherein said polydimethylcyclosiloxane is further defined as comprising one selected from the group consisting of octamethylcyclotetrasiloxane and decamethylcyclopentasiloxane.

4. The detackifying composition defined in claim 1, wherein said paraffinic solvent is further defined as comprising substantially 100% of the saturated normal paraffin structure.

5. The detackifying composition defined in claim 4, wherein said saturated normal paraffinic solvent is further defined as comprising a carbon chain length ranging between about 10 and 18 carbon atoms.

6. The detackifying composition defined in claim 5, wherein the saturated normal paraffinic solvent is further defined as comprising an initial boiling point during distillation of between about 188° C. (370° F.) and 252° C. (486° F.).

7. The detackifying composition defined in claim 6, wherein the normal paraffinic solvent is further defined as comprising an initial boiling point of 188° C. (370° F.) and a carbon chain length ranging between 10 and 13 carbon atoms.

8. The detackifying composition defined in claim 1, wherein said isobutylene butene copolymer is further defined as comprising an average molecular weight of about 320 and a specific gravity of between about 0.830 and 0.845 as measured by ASTM Standard D-1298 at 15.5° C.

9. A detackifying composition which is non-toxic, non-harmful and provides for the painless removal of adhesive bandages from the skin, said composition comprising:
   A. between about 50% and 80% by weight/volume of octamethylcyclotetrasiloxane,
   B. between about 15% and 45% by weight/volume of a saturated normal paraffinic solvent comprising a normally arranged carbon chain length ranging between about 10 and 13 carbon atoms; and
   C. between about 1% and 20% by weight/volume of an isobutylene butene copolymer comprising an average molecular weight of about 320 and a specific gravity of between about 0.830 and 0.845 as measured using ASTM Standard D-1298 at 15.5° C.

10. The detackifying composition defined in claim 9, wherein said composition further comprises between about 0.1% and 0.9% by weight of isopropyl alcohol, with the paraffinic solvent being reduced to accommodate the addition of isopropyl alcohol.

* * * * *